(12) United States Patent
Schoenblum (10) Patent No.: US 8,155,211 B2
(45) Date of Patent: Apr. 10, 2012

(54) DIGITAL STREAM TRANSCODER

(76) Inventor: Joel W. Schoenblum, Alpharetta, GA (US)

( * ) Notice: Subject to any disclaimer, the term of this patent is extended or adjusted under 35 U.S.C. 154(b) by 1335 days.

(21) Appl. No.: 11/763,117

(22) Filed: Jun. 14, 2007

(65) Prior Publication Data

US 2007/0237219 A1    Oct. 11, 2007

Related U.S. Application Data

(63) Continuation of application No. 10/397,658, filed on Mar. 26, 2003, now Pat. No. 7,236,521.

(60) Provisional application No. 60/368,068, filed on Mar. 27, 2002.

(51) Int. Cl.
*H04N 7/18* (2006.01)

(52) U.S. Cl. .......... 375/240.26; 375/240.03; 375/240.04

(58) Field of Classification Search . 375/240.01–240.29
See application file for complete search history.

(56) References Cited

U.S. PATENT DOCUMENTS

| | | | |
|---|---|---|---|
| 5,537,440 A * | 7/1996 | Eyuboglu et al. ............. | 375/245 |
| 5,870,146 A | 2/1999 | Zhu | |
| 6,058,143 A | 5/2000 | Golin | |
| 6,081,295 A | 6/2000 | Adolph et al. | |
| 6,141,447 A | 10/2000 | Linzer et al. | |
| 6,259,741 B1 | 7/2001 | Chen et al. | |
| 6,275,536 B1 | 8/2001 | Chen et al. | |
| 6,400,763 B1 | 6/2002 | Wee | |
| 6,407,681 B2 | 6/2002 | Gatepin et al. | |
| 6,434,197 B1 | 8/2002 | Wang et al. | |
| 6,441,754 B1 | 8/2002 | Wang et al. | |
| 6,526,099 B1 | 2/2003 | Christopoulos et al. | |
| 6,570,922 B1 | 5/2003 | Wang et al. | |
| 6,628,839 B1 | 9/2003 | Komiya et al. | |
| 6,748,020 B1 | 6/2004 | Eifrig et al. | |
| 6,950,463 B2 | 9/2005 | Moni et al. | |
| 6,959,116 B2 | 10/2005 | Sezer et al. | |
| 7,020,196 B2 * | 3/2006 | Suzuki et al. ............ | 375/240.12 |
| 7,266,148 B2 * | 9/2007 | Kim ......................... | 375/240.03 |
| 7,400,774 B2 * | 7/2008 | Puri et al. ...................... | 382/238 |
| 2002/0159457 A1 | 10/2002 | Zhang et al. | |
| 2002/0176504 A1 | 11/2002 | Zaccarin et al. | |

OTHER PUBLICATIONS

"DSP-Based Transcoding of Digital Video Signals with MPEG-2 Format." Bernd Sostawa, et al., IEEE Transactions on Consumer Electronics, vol. 4, No. 2, May 2000, pp. 358-362.

"MPEG-2 Multi-Program Transport Stream Transcoder," Takeshi Takahashi, et al., Waseda University, Japan, pp. 1-5, May 2002.

"A Frequency-Domain Video Transcoder for Dynamic Bit-Rate Reduction of MPEG-2 Bit Streams," Transaction Papers, Pedro A.A. Assunao and Mohammed Ghanbari, IEEE Transactions on Circuits and Systems for Video Technology, vol. 8, No. 8, Dec. 1998, pp. 953-967.

"Manipulation and Compositing of MC-DCT Compressed Video," Shih-Fu Chang and David G. Messerschmitt, IEEE Journal on Selected Areas in Communications, vol. 13, No. 1, Jan. 1995, pp. 1-11.

"THAM 15.5, a low-complexity MPEG-2 bit-rate transcoding algorithm," R. Klein Gunnewick, et al., 2000 IEEE, pp. 316-317.

(Continued)

*Primary Examiner* — Andy Rao (74) *Attorney, Agent, or Firm* — Tarolli, Sundheim, Covell & Tummino LLP (57) ABSTRACT

A run-level domain transcoder receives a stream of compressed frames carried in a bit stream. The run-level domain transcoder decodes the bit stream into run-level pairs and selectively processes the compressed frames so as to, among other things, reduce the number of bits necessary to represent the compressed frames.

19 Claims, 7 Drawing Sheets

OTHER PUBLICATIONS

"Local Bandwidth Constrained Fast Inverse Motion Compensation for DCT-Domain Video Transcoding," Shizhong Liu and Alan C. Bovik, The University of Texas at Austin, TX, 2001 IEEE, pp. 1609-1612.

"A Fast Algorithm for DCT-Domain Inverse Motion Compensation Based on Shared Information in a Macroblock," Junehwa Song and Boon-Lock Yeo, IEEE Transactions on Circuits and Systems for Video Technology, vol. 10, No. 5, Aug. 2000, pp. 767-775.

* cited by examiner

FIG. 1

PRIOR ART

$$r = \begin{bmatrix} r_0 = 0 \\ r_1 = 1 \\ r_2 = 3 \\ r_3 = 0 \\ r_4 = 1 \\ r_5 = 0 \\ r_6 = 2 \\ r_7 = 5 \end{bmatrix}_{1002} \quad \begin{bmatrix} l_0 = a \\ l_1 = b \\ l_2 = c \\ l_3 = d \\ l_4 = e \\ l_5 = f \\ l_6 = g \\ l_7 = h \end{bmatrix}_{1004} \quad \begin{bmatrix} i_0 = 0 \\ i_1 = 2 \\ i_2 = 6 \\ i_3 = 7 \\ i_4 = 9 \\ i_5 = 10 \\ i_6 = 13 \\ i_7 = 19 \end{bmatrix}_{1006}$$

FIG. 10A

$$r = \begin{bmatrix} r_0 = 0 \\ r_1 = 1 \\ \cancel{r_2 = 3} \\ \cancel{r_3 = 0} \\ r_4 = 6 \\ \cancel{r_5 = 0} \\ r_6 = 3 \\ \cancel{r_7 = 5} \end{bmatrix}_{1008} \quad \begin{bmatrix} l_0 = j \\ l_1 = k \\ l_2 = 0 \\ l_3 = 0 \\ l_4 = l \\ l_5 = 0 \\ l_6 = m \\ l_7 = 0 \end{bmatrix}_{1010} \quad \begin{bmatrix} i_0 = 0 \\ i_1 = 2 \\ i_2 = 6 \\ i_3 = 7 \\ i_4 = 9 \\ i_5 = 10 \\ i_6 = 13 \\ i_7 = 19 \end{bmatrix}_{1006}$$

FIG. 10B

$$r' = \begin{bmatrix} r'_0 = 0 \\ r'_1 = 1 \\ r'_2 = 6 \\ r'_3 = 3 \end{bmatrix}_{1012} \quad l' = \begin{bmatrix} l'_0 = j \\ l'_1 = k \\ l'_2 = l \\ l'_3 = m \end{bmatrix}_{1014} \quad r'l' = \begin{bmatrix} r'_0 = 0 & l'_0 = j \\ r'_1 = 1 & l'_1 = k \\ r'_2 = 6 & l'_2 = l \\ r'_3 = 3 & l'_3 = m \end{bmatrix}_{1016}$$

DIGITAL STREAM TRANSCODER

CROSS-REFERENCE TO RELATED APPLICATION

This application is a continuation of prior U.S. application Ser. No. 10/397,658, filed Mar. 26, 2003, now U.S. Pat. No. 7,236,521, which claims the benefit of U.S. Provisional Application No. 60/368,068, filed Mar. 27, 2002, which are both entirely incorporated herein by reference.

TECHNICAL FIELD

The present invention is generally related to broadband communication systems, and, more particularly, is related to transcoding compressed streams of information in broadband communication systems.

BACKGROUND OF THE INVENTION

Modern subscriber television systems (STS) transmit digital content, which is packetized, from a headend to a subscriber. The digital content is typically provided in a format such as MPEG or in other packet formats known to those skilled in the art. An operator of an STS typically prefers to provide programs in digital format because digital programs provide superior fidelity and because digital programs are compressed so that they generally use less bandwidth than analog programs. Digital programs are compressed using, in part, a quantization parameter.

Frequently, the operator of an STS may want to convert a compressed digital signal of a given bit rate into a compressed digital signal of a lower bit rate by using a conventional transcoder to change the quantization parameter. A conventional transcoder used for such a purpose consists of a cascaded decoder and encoder. This combination is rather complex and expensive. In the particular case of video signals, some other aspects have to be taken into account. A coded video signal consists of a succession of encoded video-frames, where each video-frame is subdivided into a two-dimensional array of macroblocks, each macroblock being composed of blocks. A video-frame may be in the spatial domain, which is the pixel domain, and is transmitted in the frequency or transform domain, which results from a Discrete Cosine Transform (DCT) of the video-frame in the spatial domain. In addition, a video-frame may be separated into two fields: the top field formed by the odd lines of the video-frame and the bottom field formed by the even lines of the video-frame. A macroblock may be conveyed in two different formats: an interlaced format and a de-interlaced format. In the interlaced video-frame format, a macroblock is composed of lines from the two fields alternately and each DCT-block of the macroblock is formed by data from the two fields. In the de-interlaced format, a macroblock is composed of lines from the two fields, and each DCT-block of the macroblock is formed by data from only one of the two fields. Each DCT-block of a video-frame is scanned and encoded.

Before a conventional pixel-domain transcoder can requantize a bit stream, the decoder portion of the transcoder converts the bit stream into pixel domain values. The encoder portion of the transcoder then requantizes and converts the pixel domain values back into DCT-domain values. Thus, there exists a need for an improved transcoder that can requantize a received bit stream without converting the received bit stream into pixel domain values.

In addition to conventional pixel-domain transcoders, there exist conventional DCT-block domain transcoders, which operate in the DCT-block domain. Such a transcoder receives a bit stream and converts the bit stream into sets of run-level pairs, where a set of run-level pairs is a compressed representation of a DCT-block, and then converts the sets of run-level pairs into DCT-blocks. The transcoder manipulates information in the DCT-block domain and then reconverts the DCT-blocks back into sets of run-level pairs, which are then converted back into a compressed bit stream. Further details regarding DCT-block domain transcoders can be found in "A Frequency-Domain Transcoder For Dynamic Bit-Rate Reduction of MPEG-2 Bit Streams," Assuncao et.al., IEEE Transactions on Circuits and Systems for Video Technology, Vol. 8, Issue 8, December 1998, pages 953-967, which is hereby incorporated by reference in its entirety; and "Manipulation and Compositing of MC-DCT Compressed Video," Chang et.al., IEEE Journal on Selected Areas In Communications, Vol. 13, No. 1, 1995, pages 1-11, which is hereby incorporated by reference in its entirety.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Preferred embodiments of the present invention will be described more fully hereinafter with reference to the accompanying drawings in which like numerals represent like elements throughout the several figures, and in which several exemplary embodiments of the invention are shown. The present invention may, however, be embodied in many different forms and should not be construed as limited to the embodiments set forth herein. The examples set forth herein are non-limiting examples and are merely examples among other possible examples.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention One way of understanding the preferred embodiments of the invention includes viewing them within the context of a subscriber television system (STS). Thus, the preferred embodiments of the invention include, among other things, systems and methods for decreasing the size of transport streams carried by an STS by requantizing in the run-level domain blocks of video information.

Because the preferred embodiments of the invention can be understood in the context of a subscriber television system environment, an initial description of a subscriber television system (STS) is provided and then followed by a description of select components that are included within a headend of the subscriber television system. Also, a run-level domain transcoder, which implements preferred embodiments of the invention and which is included in the headend at the headend, is described.

The preferred embodiments of the invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among many other examples contemplated but not shown.

Furthermore, it should be noted that the logic of the preferred embodiment(s) of the present invention can be implemented in hardware, software, firmware, or a combination thereof. In the preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), a digital signal processor (DSP) etc. In addition, the scope of the present invention includes embodying the functionality of the preferred embodiments of the present invention in logic embodied in hardware or software-configured mediums.

Subscriber Television System

Figure 1:
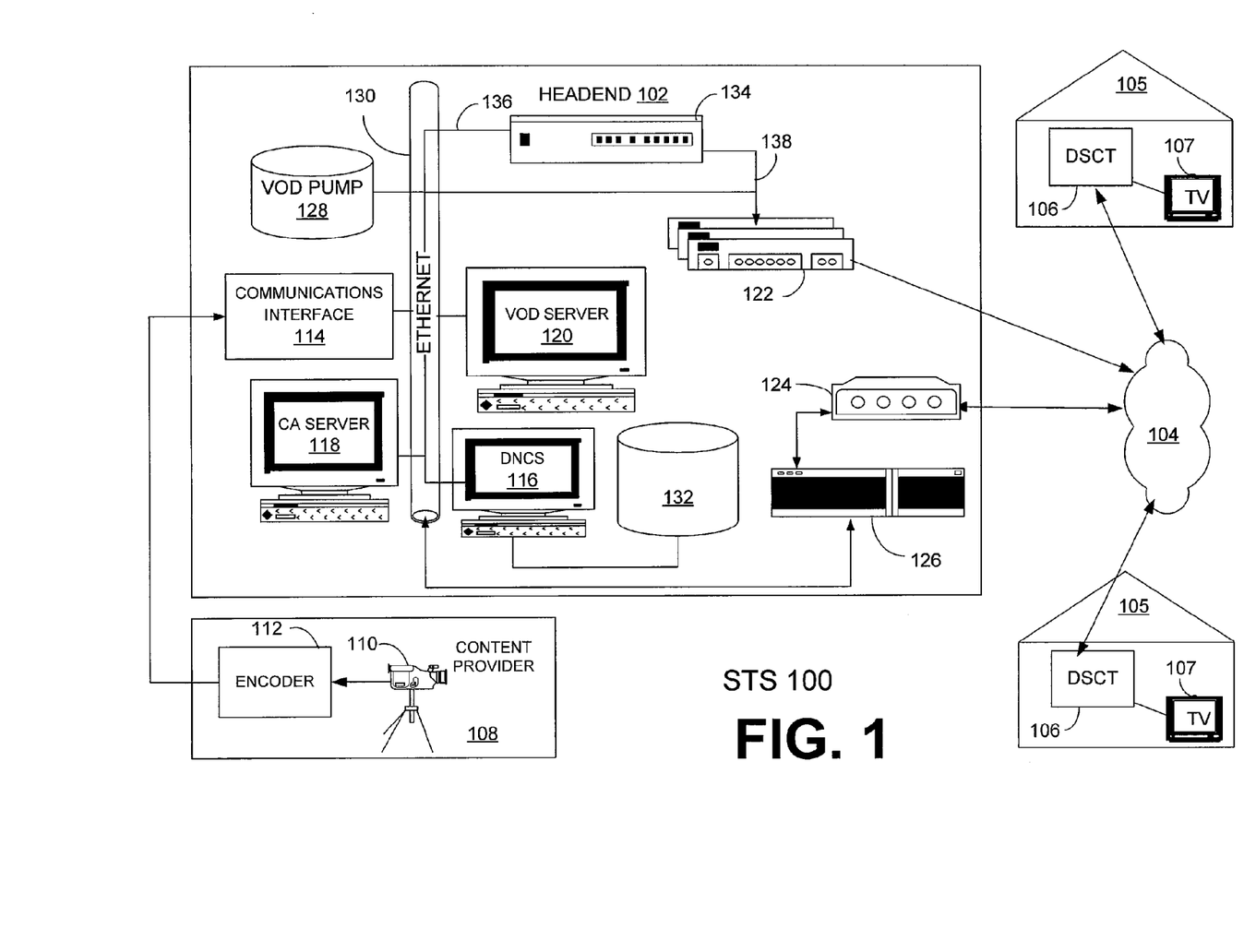
FIG. 1 is a block diagram of a broadband communications system, such as a subscriber television system, in which the preferred embodiment of the present invention may be employed.

FIG. 1 is a block diagram depicting a non-limiting example of a subscriber television system (STS) 100. In this example, the STS 100 includes a headend 102, a network 104, and multiple digital subscriber communication terminals (DSCTs) 106, which are located at subscriber premises 105.

It will be appreciated that the STS 100 shown in FIG. 1 is merely illustrative and should not be construed as implying any limitations upon the scope of the preferred embodiments of the invention. For example, the STS 100 can feature a plurality of any one of the illustrated components, or may be configured with alternative embodiments for any one of the individual components or with yet other additional components not enumerated above. Subscriber television systems also included within the scope of the preferred embodiments of the invention include systems not utilizing physical structured cabling for transmission, such as, but not limited to, satellite systems.

A DSCT 106, which is located at a subscriber's premises 105, provides among other things, a two-way interface between the headend 102 of the STS 100 and the subscriber. The DSCT 106 decodes and further processes the signals for display on a display device, such as a television set(TV) 107 or a computer monitor, among other examples. Those skilled in the art will appreciate that in alternative embodiments the equipment for first decoding and further processing the signal can be located in a variety of equipment, including, but not limited to, a computer, a TV, a monitor, or an MPEG decoder, among others.

At least one content provider 108 provides the STS 100 with digital content, which is formatted in a protocol such as, but not limited to, MPEG. Among other things, a content provider 108 can be a television station that provides "live" or "recorded" programming. A television station will include a camera 110 and an encoder 112. The encoder 112 receives content from the camera 110 and processes the content into an MPEG format, which is then provided to the headend 102 of the STS 100.

The headend 102 receives programming signals from the content providers 108, and, after processing the content from the content providers 108 according to mechanisms described hereinbelow, the headend 102 transmits programming signals to the DSCTs 106 at the subscriber premises 105. Typically, the headend 102 transmits conventional analog signals, which will not be discussed, and digital signals.

In one implementation, the digital signals are transmitted in MPEG format and embodiments of the present invention will be discussed in terms thereof. Specifically, embodiments of the present invention are described in terms of MPEG video-frames and video-fields. However, it is to be understood that describing embodiments of the present invention employing MPEG video-frames and video-fields is merely for exemplary and clarity purposes and is not a limitation on the scope of the present invention. The scope of the present invention is intended to extend to at least to all streams of quantized information. For the purposes of this disclosure a frame of information includes video-frames, top video-fields, bottom video-fields, and other predetermined blocks of information.

As shown in FIG. 1, selected components of the example headend 102 include a communications interface 114, a digital network control system (DNCS) 116, a conditional access (CA) server 118, a video-on-demand (VOD) server 120, a transport stream transmitter 122, a quadrature phase shift keying (QPSK) modem 124, a router 126, a VOD pump 128, and a run-level domain transcoder 134, which are connected via an Ethernet 130. It will be understood by those having ordinary skill in the art that the exemplary headend 102 can include additional components, such as additional servers, switches, multiplexers, transport stream transmitters, among others, or can omit some of the shown selected components.

Among other things, the DNCS 116 manages, monitors, and controls network elements and the broadcast of services provided to users. The DNCS 116 includes, among other modules, a subscriber database 132 that includes information about the subscribers for such purposes as billing information and survey data, among others. The DNCS 116 also communicates with the conditional access server 118 to provide for secure transmittal of content from the headend 102 to the DSCTs 106.

The CA server 118 selectively provides "entitlements" to the DSCTs 106 for the services and programming of the STS 100. In other words, among other things, the CA server 118 determines which DSCTs 106 of the STS 100 are entitled to access a given instance of service or program and provides the selected DSCTs 106 with the necessary keys and authorizations, among other things, to access the given instance of service. In addition, the CA server 118 informs the DNCS 116 of the entitlements of each of the DSCTs 106 in the STS 100 so that each subscriber can be properly billed. Furthermore, the CA server 118 includes a database (not shown) that includes, among other things, long term keys, the public keys of the DSCTs 106 and a private key for the CA server 118. The CA server employs long-term keys, public and private keys to securely communicate with the DSCTs 106.

The CA server 118 also provides encryption information to the transport stream transmitter 122 and to the selected DSCTs 106. The transport stream transmitter 122 employs the encryption information to encrypt the content of a program and transmits modulated programming, among other things, to the DSCTs 110 via the network 104.

The QPSK modem 124 is responsible for transporting the out-of-band IP (Internet protocol) datagram traffic between the headend 102 and the DSCT 106. Data transmitted or received by the QPSK modem 124 may be routed by the headend router 126. Among other things, the headend router 126 may be used to deliver upstream data to the various servers, such as the VOD server 120.

The run-level domain transcoder 134 receives a bit stream 136 that carries a stream of MPEG transport packets and outputs a bit stream 138 carrying a bit-size that is lower than the input bit stream 136. The run-level domain transcoder 134 is adapted to receive operator input and, among other things, requantize frames of a program carried by the input bit stream 136. The requantization is performed in the run-level domain and is done such that the requantization reduces the size of the frames. The purpose of requantization is to reduce the bit rate of the video bit streams. Alternatively, selected DCT coefficients of the bit stream can be deleted without or in conjunction with requantization to reduce the bit rate of the video stream.

MPEG Compression

Before describing the run-level domain transcoder 134 in detail, a brief description of MPEG video compression is provided. Further details of MPEG compression and MPEG in general can be found in MPEG-1 standards (ISO/IEC 11172), the MPEG-2 standards (ISO/IEC 13818) and the MPEG-4 standards (ISO/IEC 14496) are described in detail in the International Organization for Standardization document ISO/IEC JTC1/SC29/WG11 N (June 1996 for MPEG-1, July 1996 for MPEG-2, and October 1998 for MPEG-4), which are hereby incorporated by reference. MPEG video compression uses both spatial coding and temporal compression.

MPEG-2 employs three types of pictures, I-picture, B-picture, and P-picture. I-pictures are pictures that are intra-coded, i.e., compressed using only spatial compression from that video-frame, which means that they are decompressed without reference to any other video-frame. B-pictures and P-pictures are pictures that are inter-coded, i.e., compressed using information from a reference picture such as an I-picture or a P-picture, and are also spatially compressed. P-pictures are "predicted" pictures using information from a previous reference picture, and B-pictures are "bi-directionally predicted" pictures using information from a previous reference picture and from a subsequent reference picture.

A typical sequence of video pictures for display is I(1), B(2), B(3), P(4), B(5), B(6), P(7), B(8), B(9), P(10), ... P(N), I(N+1). The P-picture P(4) uses information from the I-picture I(1); the B-pictures B(2) and B(3) use information from the I-picture I(1) and P-picture P(4); the P-picture P(7) uses information from the P-picture P(4); and the B-pictures B(5) and B(6) use information from the P-pictures P(4) and P(7). The pictures between I(1) and P(N), inclusive, are known as a group of pictures (GOP) and typically number between 12-16, inclusive.

Those skilled in the art recognize that an MPEG frame is made up of macro-blocks, which are 16×16 pixels in size. In a typical picture for display on a television, a high quality National Television System Committee (NTSC) frame is made up of approximately 1350 macro-blocks. Common MPEG-2 standards include 4:2:0 and 4:2:2. In the 4:2:0 standard, a 16×16 macroblock is represented by four 8×8 luminescent blocks and two 8×8 color difference blocks, which are generated by down sampling each axis by a factor of 2. In the 4:2:2 standard, the chroma is not down sampled, and consequently there is twice as much chroma information. Thus, in the 4:2:2 standard, a 16×16 macroblock is represented by six 8×8 blocks, and in the 4:2:2 standard, a 16×16 macroblock is represented by eight 8×8 macroblocks. All of the 8×8 blocks that represent a macro-block are steered from a reference picture (I-picture or P-picture) to a temporally compressed picture (P-picture or B-picture) by a common motion vector.

Figure 2:
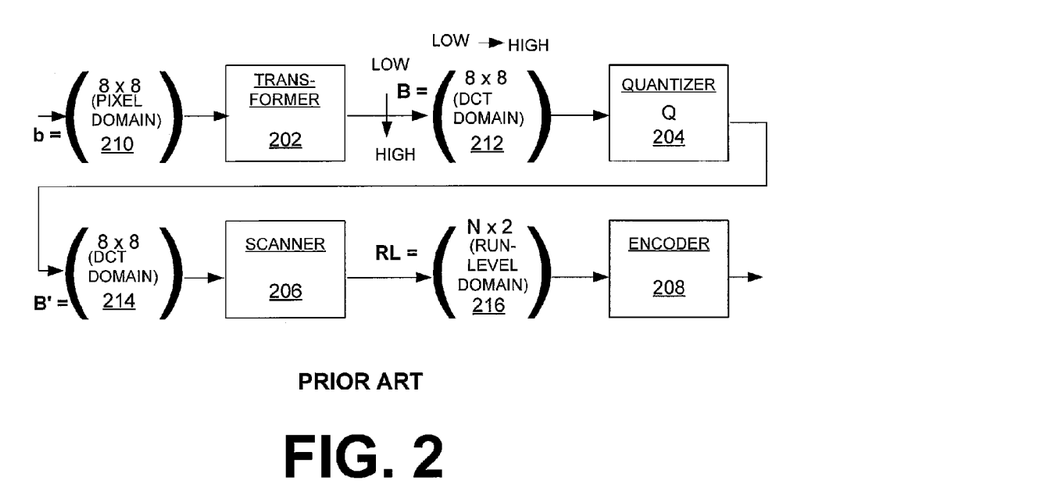
FIG. 2 is a block diagram of an encoder.

Spatial compression in MPEG-2 is based upon transforming each macro-block using a two dimensional discrete cosine transform (DCT) on each of the 8×8 blocks to convert from the pixel domain to the frequency domain, also known as the DCT domain. The steps in which an MPEG encoder, such as encoder 112, spatially compresses frames are illustrated in FIG. 2. The encoder 112 includes a transformer 202, a quantizer 204, a scanner 206, and a binary encoder 208. The transformer 202 transforms each block of pixel information 210 of a picture into a DCT domain block 212 using a discrete cosine transform. The pixel domain block 210 is written as a matrix b, whose elements are given as b(n,m), where n and m range from 0 to 7, inclusive. The DCT domain block 212 is written as a matrix B, whose elements are given as B(k,j), where k and j range from 0 to 7, inclusive. The transformer 202 uses the following equation to transform from pixel domain to DCT domain:

$$B(k, j) = \frac{c(k)}{2} \frac{c(j)}{2} \sum_{n=0}^{7} \sum_{m=0}^{7} b(n, m) \cos\left(\frac{(2n+1) \cdot k\pi}{16}\right) \cos\left(\frac{(2m+1) \cdot j\pi}{16}\right), \quad (1)$$

where $c(0)=1/\sqrt{2}$ and $c(n)=1$ for $n>0$.

The zero-frequency (DC) component, B(0,0), is in the top right hand corner of DCT domain matrix 212 and the coefficient for the highest frequencies, B(7,7), is in the bottom left hand corner of the DCT domain matrix 212.

The DCT coefficients are not treated equally because the human eye is less responsive to high frequencies than low frequencies. Consequently, the quantizer 204 applies a weight factor to each of the DCT coefficients while quantizing them. Quantization usually results in a sparse representation of the DCT coefficients, i.e., one in which most of the amplitudes of the coefficients are equal to zero. In one implementation, the quantizer 204 employs the following weight-quantization scheme:

$$B'(k,j)=\text{int}([2B(k,j)+1]\cdot Q\cdot w(k,j)/16, \tag{2a}$$

for inter-coded blocks and $$B'(k,j)=\text{int}(2B(k,j)\cdot Q\cdot w(k,j)/16, \tag{2b}$$

for intra-coded block, where int( ) is the integer function, w(k,j) is the weight factor for element (k,j), and Q is the quantization parameter. An MPEG decoder would then employ the following inverse weight-quantization scheme:

$$B(k,j)=\text{nint}(B'(k,j)\cdot 16\cdot Q/w(k,j)), \tag{3}$$

where nint( ) is the nearest integer function. Those skilled in the art recognize that other quantization schemes, which will not be discussed, but are intended to within the scope of the invention, can also be used.

The scanner 206 performs a zig-zag scan on the quantized DCT matrix (B') 214 and produces a run-level domain matrix (RL) 216, which has the dimensions of (N+1)×2, where N is the number of non-zero coefficients in the quantized DCT matrix (B') 214. Finally, a binary encoder 208 converts the run-level pairs of the run-level domain matrix (RL) 216 into a bit stream using Huffman coding. It should be remembered that the preferred embodiments of the invention are being described in terms of MPEG standards, which use Huffman coding. However, the present invention is not intended to be limited to only MPEG standards and other coding techniques known to those skilled in the art can be used in other preferred embodiments.

Figure 3A:
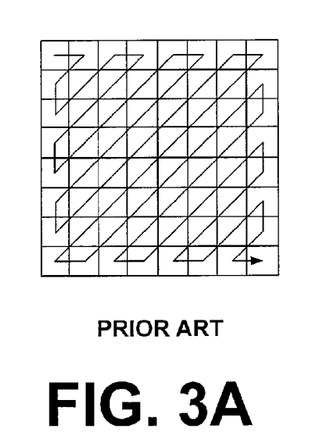
FIGS. 3A and 3B are diagrams of zig-zag scan order.
Figure 3B:
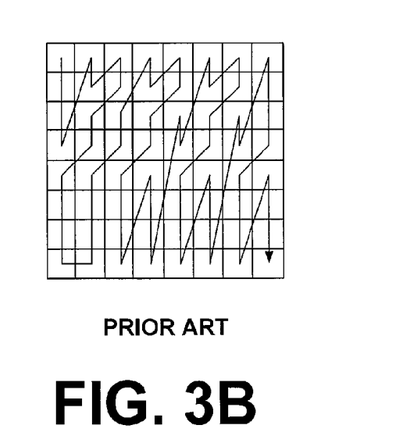

FIGS. 3A and 3B illustrate two possible scan orders. The scan order illustrated in FIG. 3A is implemented by the scanner 206 for scanning the quantized DCT matrix (B') 214 when the DCT matrix represents a portion of a non-interlaced video-frame. FIG. 3B illustrates the scan pattern that is implemented when the DCT matrix represents a portion of an interlaced video-field.

Figure 4A:
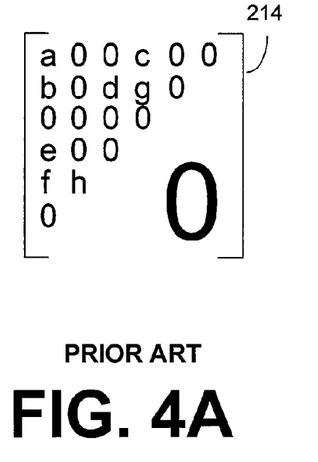
FIG. 4A is a diagram of a quantized matrix.
Figure 4B:
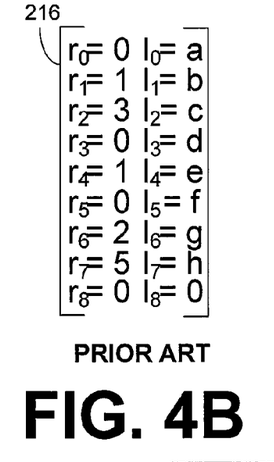
FIG. 4B is a diagram of a set of run-level pairs for the quantized matrix illustrated in FIG. 4A.

FIG. 4A illustrates an exemplary quantized DCT-domain matrix (B') 214, and FIG. 4B illustrates the corresponding run-level domain matrix (RL) 216 after the scanner 206 has employed the scan pattern illustrated in FIG. 3A on the exemplary DCT-domain matrix 214. In the run-level domain, run refers to the number of consecutively scanned coefficients having the value of zero that precede a non-zero coefficient, and level refers to the amplitude of the non-zero coefficients. The number of coefficients having the value of zero preceding the zero-frequency (D.C.) coefficient (B(0,0)=a) is zero, and thus the run-level pair for the D.C. coefficient is (0, a). The only zero coefficient interposing B(0,0) and B(1,0) is B(0,1), and thus the run-level pair for B(1,0) is given by (1, b ). All of the coefficients following the B(4,1) coefficient (B(4,1)=h) are zero and are represented by an end-of-block marker, denoted by the run-level pair (0,0). Thus, after processing by the quantizer 204 and the scanner 206, the 64 (real number) coefficients in the DCT domain matrix (B) 212 are now represented by nine pairs of runs and levels (18 integers). The conversion of 64 real numbers into 18 integers (levels) reduces the number of bits necessary to represent the exemplary DCT-domain matrix 214.

Figure 4C:
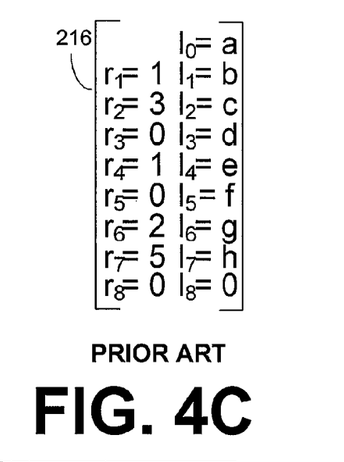
FIG. 4C is a diagram of a set of run-level pairs for the quantized matrix illustrated in FIG. 4A.

FIG. 4C illustrates an alternative embodiment of a set of run-level pairs 216. In intra-coded frames, MPEG-2 treats DC levels, the B(0,0) element of matrix 214, differently from the higher frequency levels. The DC level of a block is allocated a set number of bits (N), which is greater than the number of bits for the other levels, because the human eye is more responsive to lower frequencies. Thus, the first N bits of the run-level pairs of an intra-coded frame are the DC level and there is no run value associated with the DC level because by definition that run would have to be zero.

An MPEG decoder such as the DCT 106 performs inverse operations to convert a bit stream into frames. The MPEG decoder has a binary decoder (not shown) that, among other things, converts a bit stream into sets of run-level pairs, where a set of run-level pairs represents an 8×8 block of pixels. An inverse scanner (not shown) converts sets of run-level pairs into 8×8 matrices of DCT quantized coefficients. An inverse quantizer (not shown) multiplies the levels by the quotient of the quantization factor Q divided by the weight factor for each of the levels. Lastly, an inverse transformer (not shown) transforms the levels back into pixel domain values. Thus, MPEG encoding and decoding involve a lot of computational complexity due to, among other things, the matrix operations and DCT transformation and inverse transformations.

As previously stated, P-pictures and B-pictures are partially compressed by using information from at least one reference frame. In a sequence of pictures, there is normally a lot of redundant information that does not change substantially from one picture to the next. Bandwidth can be saved by sending motion information that is used to map portions of a reference frame into an inter-coded frame and then adding a correction or residual. The concept of inter-coding is illustrated in FIGS. 5-6.

Figure 5A:
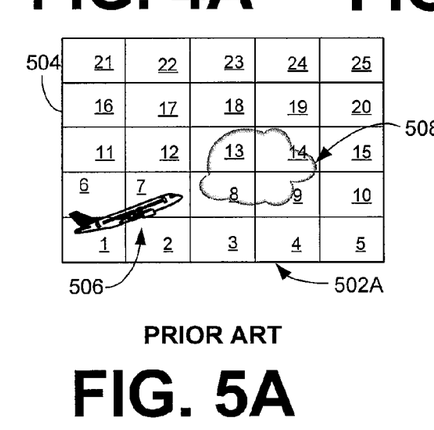
FIGS. 5A and 5B are illustrative pictures from a sequence of pictures.
Figure 5B:
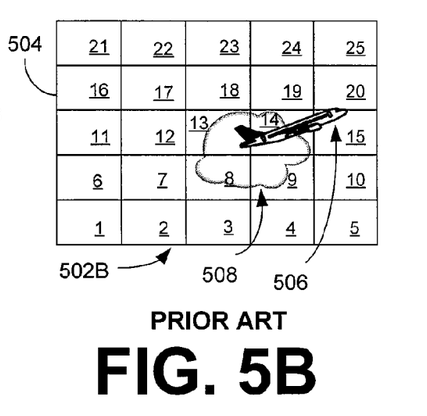

FIGS. 5A and 5B are illustrative pictures 502A and 502B, respectively, in a sequence of pictures. Each of the pictures 502A and 502B are divided into blocks 504, which are numbered 1-25. In the picture 502A, an ascending airplane 506 is in blocks 504 that are labeled 1, 2, 6 and 7, a cloud 508 is in blocks 504 that are label 8, 9, 13 and 14, and sky (not shown) is in all of the 25 blocks. In the picture 502B the airplane 506 is passing in front of the cloud 508. Much of the information of picture 502B is contained in picture 502A, and the picture 502B can be roughly generated by appropriate translations of blocks from the reference frame into a partial picture.

Figure 6A:
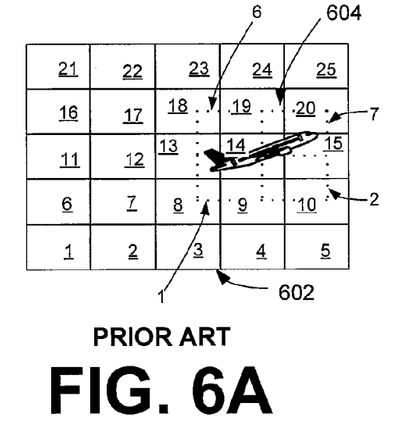
FIG. 6A is a partial picture of the picture illustrated in FIG. 5B.

FIG. 6A illustrates a partial picture 602. In the partial picture 602, the airplane 506 is generated by referencing frame 502A and using motion vectors to translate the plane 506 from blocks 1, 2, 6 and 7 into blocks 9, 10, 14 and 15. The dashed box 604 represents the blocks 1, 2, 6 and 7 of frame 502A and illustrates how the plane 506 can be reconstructed by motion information referencing the frame 502A.

Figure 6B:
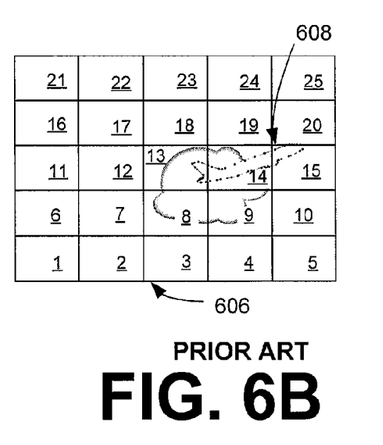
FIG. 6B is a residual picture.

After the encoder has generated a partial representation of picture 502B, a residual frame 606, which is illustrated in FIG. 6B, is generated. The residual frame 606 is the difference between the actual picture 502B and the partial picture 602. The dashed outline 608 of the airplane represents the difference between the actual airplane 506 of the frame 502B and the translated airplane 506 of the partial picture 602. The difference compensates for factors such as change of lighting and perspective. Thus, picture 502B is temporally compressed by sending motion vectors that translate specific blocks 504 from a reference frame, in this case frame 502A, and the residual frame 606. The residual frame 606 is compressed using the spatial compression techniques described hereinabove.

Run-Level Domain Transcoding

Figure 7:
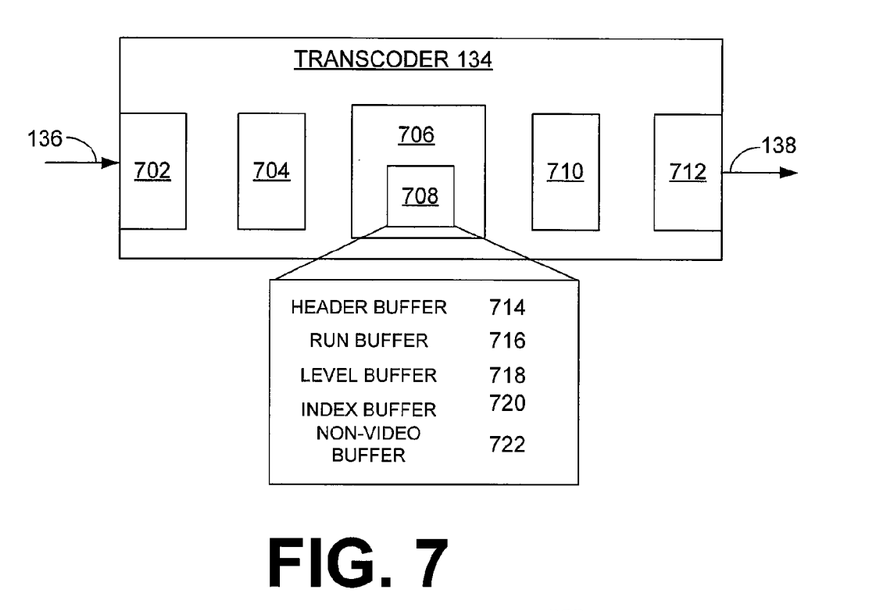
FIG. 7 is a block diagram of a transcoder.

Referring to FIG. 7, the run-level domain transcoder 134 includes an input buffer 702, a vector length decoder (VLD) 704, a processor 706, a memory 708, a vector length encoder (VLE) 710, and an output buffer 712. The input buffer 702 receives the bit stream 136 and provides the bit stream to the VLD 704. Among other things, the VLD 704 parses headers such as the picture headers, slice headers, macroblock headers, which include motion vectors, and others from the bit stream and provides the headers to the memory 708. A slice header includes information about a horizontal sequence of macroblocks, and a macroblock header includes information about a macroblock.

In addition, the VLD 704 also parses non-video frames of information and provides the non-video frames to the memory 708 and parses run-level pairs from the bit stream and provides the run-level pairs to the memory 708. The memory 708 includes a header buffer 714, a run buffer 716, a level buffer 718, an index buffer 720, and a non-video frame buffer 722. The header buffer 714 includes information from the headers of the MPEG packets such as, but not limited to, picture headers, slice headers, and macroblock headers. The run buffer 716 has sets of runs stored therein, and the level buffer 718 has the sets of levels associated with the sets of runs stored therein. For the purposes of this disclosure, a set of run-level pairs represents a block of DCT coefficients, which in turn represent a block of pixel values.

The processor 706 processes frames in the run-level domain so that, among other things, a processed frame may be represented by fewer bits. In the preferred embodiment, the processor 706 processes multiple sets of run-level pairs in parallel.

In one preferred embodiment of the invention, the processor 706 is a general-purpose processor. In alternative embodiments, the processor 706 could be, but is not limited to, a digital signal processor (DSP), an FPGA, an ASIC, or any combination of these processing elements.

After processing a frame of information in the run-level domain, the processor 706 sends the processed frame to the VLE 710. As those skilled in the art will recognize, processor 706 controls the processing of frames such that the VLE receives video and non-video frames in the same sequence that the frames were received by the input buffer 702.

Among other things, the VLE 710 converts the processed frame into binary information and encapsulates the binary information into multiple MPEG packets. The VLE 710 converts run-level pairs from pairs of integer values into binary sequences using well-known techniques such as, but not limited to, Huffman coding.

The output buffer 712 receives MPEG packets from the VLE 710 and transmits the MPEG packets in the binary stream 138.

It should be emphasized that the preferred embodiments of the present invention are improvements over conventional transcoders. A conventional transcoder that transcodes an MPEG stream is essentially a cascaded MPEG decoder-encoder pair. The MPEG decoder portion of a conventional transcoder receives a bit stream and a VLD processes the bit stream to, among other things, recover therefrom sets of run-level pairs. The levels of each set are then inverse quantized, i.e., multiplied by the quotient of the initial quantization parameter ($Q_1$) divided by a weight factor. Next, each set of run-level pairs is inverse scanned, i.e., converted from a N×2 matrix into an 8×8 matrix of levels (DCT coefficients). Next, an inverse DCT operation transforms the DCT coefficients back into pixel domain values. Reference frames in pixel domain representation are stored so that they can be used to generate complete pixel domain frames of inter-coded compressed frames. The pixel domain frames are sent from the MPEG decoder portion of the conventional transcoder to the MPEG encoder portion of the conventional transcoder.

In the MPEG encoder portion of a conventional transcoder, an adder subtracts portions of pixel domain reference frames from inter-coded frames to generate the residual frames. Pixel domain reference frames and residual frames are transformed into DCT coefficients by a DCT module. Each block of 8×8 DCT coefficients is then requantized using a new quantization parameter $Q_2$, thereby converting real numbers into integers, i.e., levels. Next, each 8×8 block of levels is then scanned and converted into sets of run-level pairs. A VLE module receives, among other things, header information and run-level pairs and processes its inputs into MPEG packets.

In addition, when a frame is a reference frame, the requantized levels are also sent to an inverse quantization module, which then multiplies levels by the quotient of the $Q_2$ parameter divided by appropriate weighting factor. An inverse DCT module receives the blocks of levels and transforms the blocks of levels back into pixel domain values. If the reference frame is an intra-coded frame, e.g., an I-picture, the reference frame is stored in a buffer. If the reference frame is an inter-coded frame, e.g., a P-picture, the motion compensation is applied such that pixels of the residual frame are added to pixel values that have been taken from a previous reference frame to generate the actual inter-coded reference frame, which is then stored in a buffer. Thus, requantizing a bit stream using a conventional transcoder involves many operations and inverse operations and initialization operations. For example, prior to performing the inverse scan operation, the entire 64 element DCT block must be initialized, i.e., set to zero, to prepare for filling the block with new data. For the 4:2:0 video standard, the initialization for the inverse scan operation alone would require approximately $15.5 \times 10^6$ operations per second for a high resolution NTSC frame. The number of operations per second is calculated using the following equation:

$$N_{op} = N_{block} \times N_{MB} \times 64 \times f = 15.5 \times 10^6 \quad (4)$$

where $N_{blocks}$ equals 6, $N_{MB}$=1,350, the number of macroblocks per frame, and f=30 frames per second.

Figure 8:
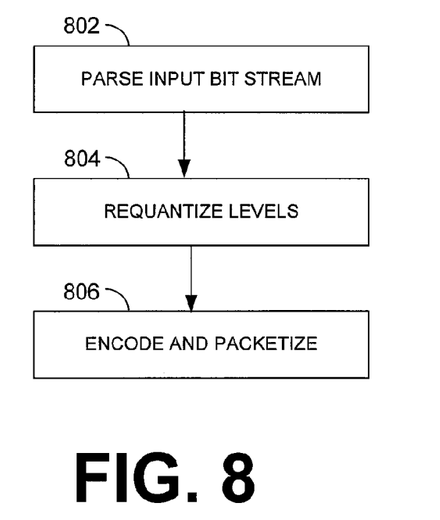
FIG. 8 is a flow chart of steps taken in requantizing a digital stream.

FIG. 8 is a flow chart of steps taken by the run-level domain transcoder 134 for implementing requantization of a received MPEG stream. In step 802, the VLD 704 parses, among other things, the header information, motion information, non-video frames, from MPEG packets and provides the parsed information to the memory 708. The VLD 704 also decodes the binary representation of sets of run-level pairs into integer sets of run-level pairs and provides the runs and levels of a set to the memory 708, where they are buffered in buffers 716 and 718, respectively.

In step 804, the processor requantizes sets of run-level pairs of the current frame by multiplying the quantized levels by the ratio of $Q_1/Q_2$, where $Q_1$ is the old quantization factor and $Q_2$ is the new quantization factor. The processor also updates macroblock headers and slice headers of the current frame. Macroblock headers include fields for, among other things, Coded Block Pattern (CBP), Macroblock Type (MBTYPE), Macroblock Address Increment (MBINC), and Quantization Scale Code (QSC), which are updated after requantization. The quantization scale code is always present in the slice header and optionally may be present in the macroblock header. When the quantization scale is changed, it is necessary to update the appropriate header, which may be a slice header or macroblock header. If the requantization is done on a set of run-level pair by set of run-level pair basis, then the quantization scale is changed in the macroblock headers. Whereas, if the requantization is done on a slice of blocks, then the quantization scale is changed in the slice header.

In step 806, the VLE 710 encodes run-level pairs and encapsulates frames in MPEG packets.

Figure 9:
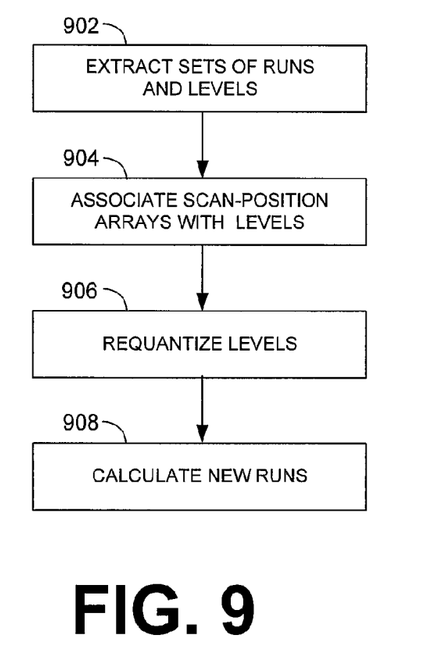
FIG. 9 is a flow chart of steps taken in requantizing a digital stream.

Referring to FIG. 9, which further illustrates exemplary steps implemented by the processor 706 in step 804, the processor 706 extracts at least one set of runs and levels from buffers 716 and 718, respectively in step 902.

In step 904, the processor associates a scan-position array with each extracted set of run-level pairs. A scan-position array has the maximum dimension of 64 elements, which corresponds to the maximum size of the levels in the pairs in a set of run-level pairs. The elements of the scan-position array are the scan position of the non-zero levels, DCT coefficients.

In step 906, the processor applies a requantization technique to the levels. An example of a requantization technique is given by the following equation:

$$l_2 = \text{NINT}(l_1 \times Q_1/Q_2), \quad (5)$$

where NINT( ) is the nearest-integer operation, $Q_1$ is the initial quantization parameter, $Q_2$ is the new quantization parameter, and $l_1$ is the value of the level before requantization.

In step 908, the processor 706 determines the runs for the requantized levels. Some of the levels will have changed to zero, and consequently, some new run values need to be determined. However, it should be emphasized that the new run values are determined without expanding the updated levels into an 8×8 matrix or equivalently into a 64×1 matrix.

Figure 10A:
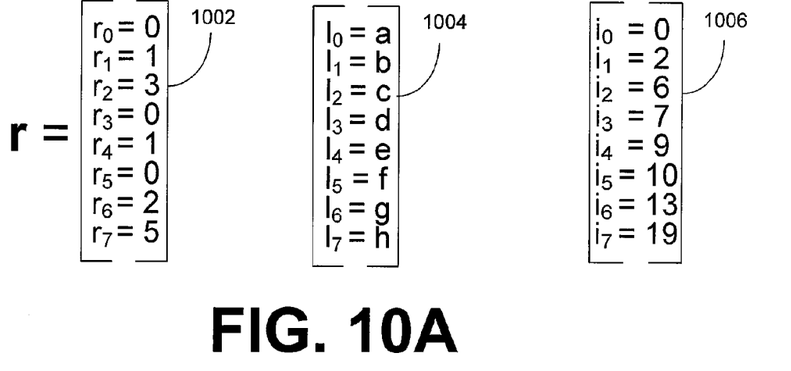
FIG. 10A shows block diagrams of a run array, level array, and scan-position array.

A set of run-level pairs and its associated scan-position array are illustrated in FIG. 10A as run array 1002, level array 1004, and scan-position array 1006. The subscript of each of the array elements gives the position of that element for its particular array. The value of each non-zero element in the scan-position array is the position of the associated level in the zig-zag scan order starting from zero. The VLD 704 calculates the scan position for each element of the scan-position array using the following equations:

$$i_n = r_n + i_{n-1} + 1, \quad (6a)$$

for n>0, and $$i_n = r_n, \quad (6b)$$

for n=0.

Figure 10B:
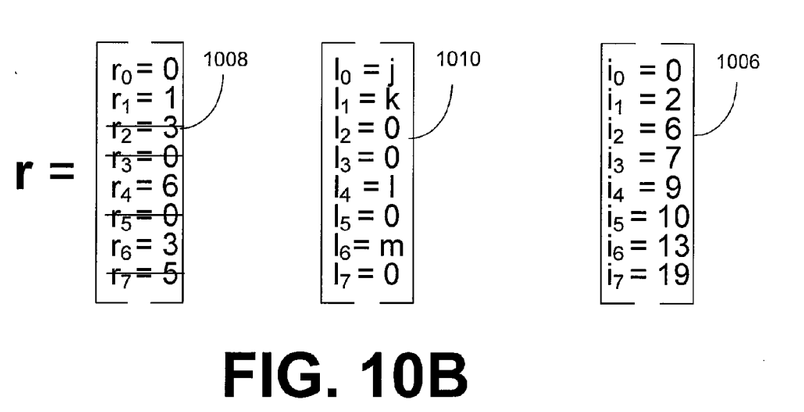
FIG. 10B shows block diagrams of the run array, the level array, and the scan-position array illustrated in FIG. 10A after requantization.

FIG. 10B illustrates a temporary run array 1008, a temporary level array 1010, and the scan-position array 1006 after requantization. The processor 706 calculates new run values for the temporary run array 1008 using the following equations:

$$r'_n = r_n - i_{n-k(n)-1} - 1, \quad (7a)$$

for k(n)<n, and $$r'_n = i_n, \quad (7b)$$

for k(n)=n, where k(n) is the number of levels that were zeroed in the temporary level array 1010 interposing the $n^{th}$ element and the first preceding non-zero element, for example, k(4)=2 because level $l_1$ is not zero and levels $l_2$ and $l_3$ have been set to zero. Runs that correspond to levels that are zeroed by requantization are ignored.

Figure 10C:
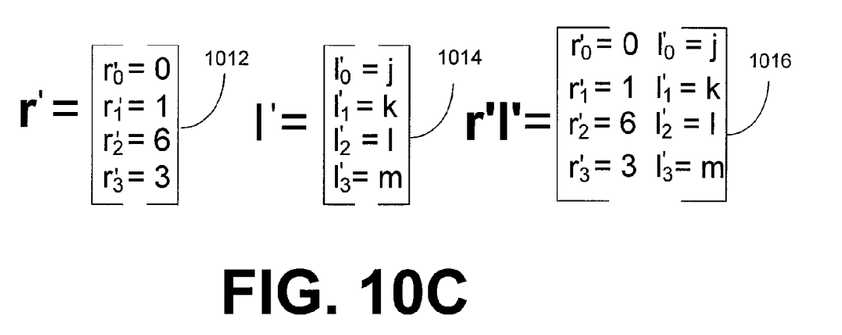
FIG. 10C shows block diagrams of an updated run array, an updated level array, and an updated scan-position array.

FIG. 10C illustrates an updated run array 1012, an updated level array 1014, and corresponding set of run-level pairs 1016. The updated run array 1012 corresponds to the new run values illustrated in FIG. 10B, and the updated level array 1014 corresponds to the non-zero requantized levels illustrated in FIG. 10B.

In one preferred embodiment, instead of receiving the updated set of run-level pairs 1016, the VLE 710 receives the temporary run array 1008 and temporary level array 1010. The VLE 710 is adapted to ignore runs that are associated with levels that have been set to zero. Thus, in the exemplary arrays illustrated in FIG. 10B, the VLE 710 only Huffman encodes the run-level pairs $(r_0,l_0)$, $(r_1,l_1)$, $(r_4,l_4)$ and $(r_6,l_6)$. This embodiment does not require reformatting the size of the buffers for the updated run array 1012 and the updated level array 1014.

It should be noted that tremendous computational efficiencies are had by using the scan-position array in calculating the new run values. The updated runs are computed using single-instruction-multiple-data techniques (parallel processing) on a programmable digital signal processor (DSP).

In one preferred embodiment, the bit size of the frames are reduced by selectively deleting run-level pairs from sets of run-level pairs, as to opposed zeroing through requantization. In this embodiment, the processor 706 determines which levels in a set of run-level pairs are to be deleted and those levels are then set to zero. After setting those levels to zero, the processor 706 determines new run values using equation 7. The processor 706 is adapted to determine which levels to selectively set to zero using criteria such as level magnitude and frequency. The processor 706 selectively zeros levels of a set of run-level pairs using a thresholding function that selectively zeros levels based upon both amplitude and frequency. Because the human eye is more responsive to lower frequencies than higher frequencies, the threshold for zeroing high frequency levels is different from the threshold for low frequency level so that the high frequency levels are more predominately zeroed.

Working in the run-level domain instead of the pixel domain provides for increased computational efficiency. As previously noted, just initializing the inverse DCT matrix requires approximately $15.5 \times 10^6$ operations per second for high quality NTSC frames. Because we are working in the run-level domain instead of the pixel domain, these initialization operations do not need to be performed. As another example of increased efficiency consider operations for quantization. Take for example a 3-megabit per second (mbits/s) NTSC MPEG-2 bit stream with an average number of DCT coefficients of 30,000 per picture. Assuming two operations per requantized coefficient in equation 5, requantization requires an operation count of $30,000 \times 2 \times 30 = 1.8 \times 10^6$ operations per second. Whereas, for a conventional transcoder the number of operations per second for inverse quantizing or requantizing would be $6 \times 64 \times 1,350 \times 30 \times nq = 15,552,000$ nq operations per second where nq is the number of operations for quantizing of a coefficient. The number of operations for quantization or inverse quantization depends upon the quantization/inverse quantization scheme that is implemented, but when the quantization scheme of equation 2 is implemented, nq is approximately 3 or 4, and consequently, for a conventional transcoder, requantization requires approximately $47 \times 10^6$ to $62 \times 10^6$ operations.

Run-Level Domain Motion Compensation

Figure 11:
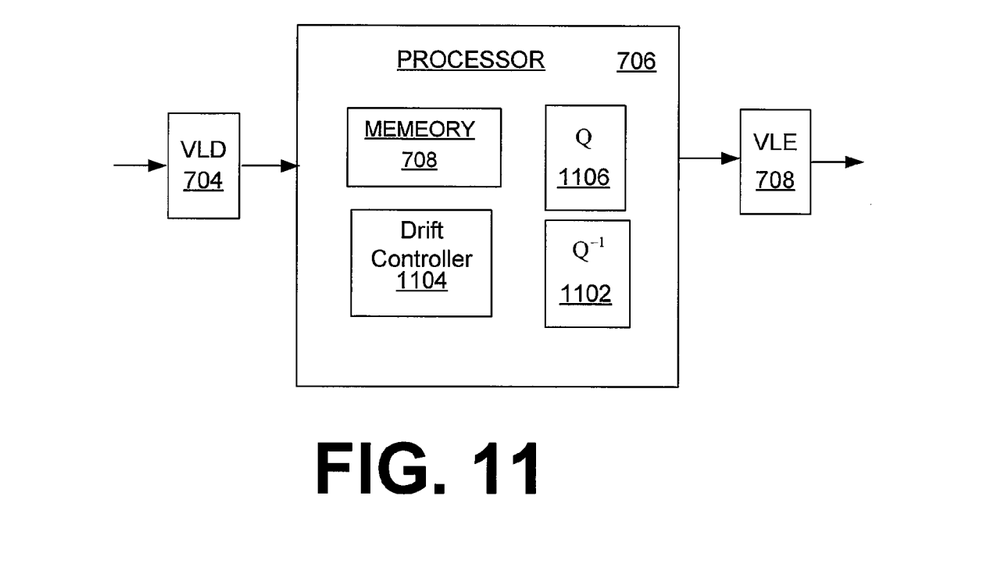
FIG. 11 is a block diagram of selected components of a transcoder.

In an alternative preferred embodiment, the run-level domain transcoder 134 not only requantizes levels and/or selectively zeros levels in the run-level domain, but also, in run-level domain, applies motion compensation to inter-coded frames. FIG. 11 illustrates some of the functional components that are included in the processor 706 and the VLD 704 and VLE 710. The processor 706 includes the memory 708, an inverse quantizer 1102, a drift controller 1104, and a quantizer 1106.

The inverse quantizer 1102 receives sets of run-level pairs from the VLD 702. The levels in the sets were quantized with the quantization $Q_1$ by an upstream MPEG encoder. The inverse quantizer 1102 multiplies the levels in the sets by the quantization parameter $Q_1$ and applies an appropriate function such as, but not limited to, nint( ) or int( ), to the result. Thus, $1=nint(l(Q_1)\times Q_1)$, where $l(Q_1)$ is the quantized value of the level and "1" is the unquantized value. The drift controller 1104 receives the sets of unquantized run-level pairs, each set is denoted by $\{r, l\}$, and implements logic for opportunistic motion control in the run-level domain, which will be explained in detail hereinbelow.

The memory 708 includes DCT-domain motion compensation matrices (G), a current frame buffer, and reference frame buffers. The current frame buffer and reference frame buffers are used to buffer frames, and a frame is composed of a group of sets of run-level pairs, where a set of run-level pairs represents a block of DCT coefficients representing a block of pixels. The processor 704 processes the current frame using the reference frames and the DCT-domain motion compensation matrices (G) as needed to, among other things, produce sets of updated run-level pairs. The quantizer 1106 quantizes the sets of updated run-level pairs using a new quantization parameter $Q_2$, and the drift controller 1104 calculates new runs for the requantized sets of run-level pairs. In the preferred embodiment the drift controller 1104 calculates the runs of the requantized sets of run-level pairs in the run-level domain using equation 7. The drift controller 1104 provides the VLE 710 with the updated requantized sets of run-level pairs, which then encodes them as previously described.

Figure 12:
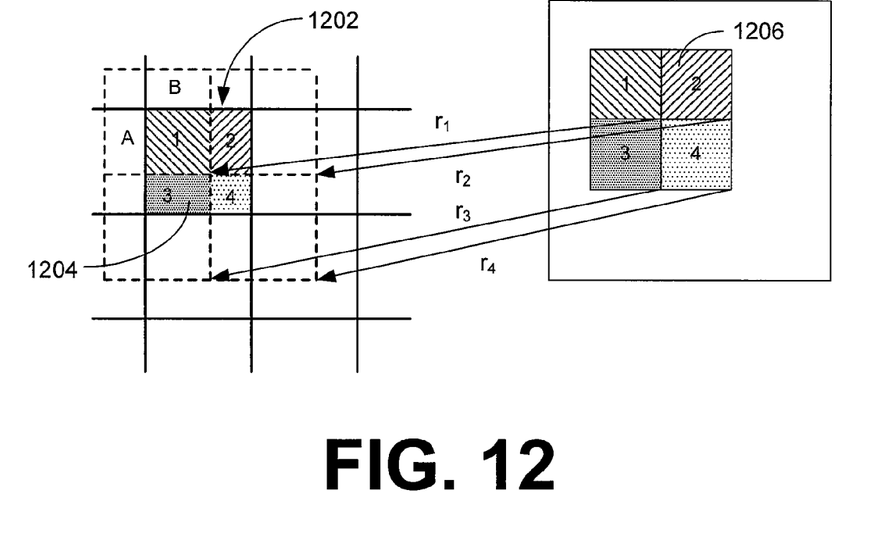
FIG. 12. is a block diagram of a motion compensated block.

As previously described an inter-coded frame is generated at an MPEG decoder by adding pixel information from blocks in a reference frame to pixels of a residual frame. The MPEG decoder uses motion vectors, which are included in the headers of the inter-coded frame, to translate a block of pixel values from a reference frame to the inter-coded frame. Typically, a motion compensated block, one in which information is retrieved from one or more reference frames, is made up of portions of more than one reference block. FIG. 12 illustrates a common situation, which occurs when both components of a motion vector are not integer multiples of the block size, e.g., 8 pixels. A motion compensated block 1202 is made up of four sub-blocks 1204, which are labeled 1-4, and a residual block (not shown). Each sub-block 1204 is a portion of a reference block 1206. Sub-block 1204(1) is (A×B) in size, where "A" is the number of rows of pixels and "B" is the number of columns of pixels, and corresponds to the bottom right hand corner of reference block 1206(1); sub-block 1204(2) is (A×(8−B)) in size and corresponds to the bottom left hand corner of reference block 1206(2); sub-block 1204(3) is ((8−A)×B) in size and corresponds to the top right hand corner of reference block 1206(3); and sub-block 1204(4) is ((8−A)×(8−B)) in size and corresponds to the top left hand corner of reference block 1206(4). The motion vectors, $r_1$-$r_4$, translate the reference blocks 1206(1)-1206(4) such that the sub-blocks 1204(1)-1204(4) are appropriately positioned.

In matrix form, the motion compensated block 1202 is denoted by $d^{mc}$ and is given by the following equation:

$$d^{mc} = \sum_{i=1}^{4} d_i, \quad (8)$$

where $d_i$ is an 8×8 matrix given by the following equation:

$$d_i = h_i^{nr} b_i w_i^{nc}, \quad (9)$$

where $b_i$ is the $i^{th}$ reference block 1206, nr and nc are the number of rows and columns, respectively, of the sub-block 1204(i), and $h_i^{nr}$ and $w_i^{nc}$ are of the form of upper and lower diagonal matrices having identity sub-matrices. The h matrices for the four sub-blocks 1204 are as follow:

$$h_1^{nr} = \begin{bmatrix} 0 & I^{nr} \\ 0 & 0 \end{bmatrix},$$

$$h_2^{nr} = \begin{bmatrix} 0 & I^{nr} \\ 0 & 0 \end{bmatrix},$$

$$h_3^{nr} = \begin{bmatrix} 0 & 0 \\ I^{8-nr} & 0 \end{bmatrix},$$

$$\text{and } h_4^{nr} = \begin{bmatrix} 0 & 0 \\ I^{8-nr} & 0 \end{bmatrix};$$

and the w matrices are as follows:

$$w_1^{nc} = \begin{bmatrix} 0 & 0 \\ I^{nc} & 0 \end{bmatrix},$$

$$w_2^{nc} = \begin{bmatrix} 0 & I^{8-nc} \\ 0 & 0 \end{bmatrix},$$

$$w_3^{nc} = \begin{bmatrix} 0 & 0 \\ I^{nc} & 0 \end{bmatrix},$$

$$\text{and } w_4^{nc} = \begin{bmatrix} 0 & I^{8-nc} \\ 0 & 0 \end{bmatrix}.$$

Applying the discrete cosine transform to equation 9 yields:

$$DCT(d) = \sum_{i=1}^{4} DCT(d_i) \quad (10a)$$

$$= \sum_{i=1}^{4} DCT(h_i^{nr})DCT(b_i)DCT(w_i^{nc})$$

$$D = \sum_{i=1}^{4} D_i = \sum_{i=1}^{4} H_i^{nr} B_i W_i^{nc}, \quad (10b)$$

because the $h_i^{nr}$ and $w_i^{nc}$ matrices are unitary orthogonal, the DCT operation is distributive. All of the matrices in equations 8-10 are 8×8 in size, and consequently, by arranging the elements of the D, $D_i$, and $B_i$ matrices in a predetermined order, such as the scan order shown in FIG. 3A, each component of equation 10b can be rewritten as $$D'_i = G_i(H_i^{nr}, W_i^{nc})B'_i, \quad (11)$$

where the primed matrices are 64×1 in size and G, which is a function of the H and W matrices, is a 64×64 matrix that is calculated from the H and W matrices. Consider matrices a, b, c, d and e, which are all the same size (N×N), where $$a = cdb = (cd)b = eb, \quad (12)$$

and the (n,m) component of matrix a is given by $$a_{n,m} = \sum_{\alpha=0}^{N-1} e_{n,\alpha} b_{\alpha,m} = \sum_{\beta=0}^{N-1} \sum_{\alpha=0}^{N-1} c_{n,\beta} d_{\beta,\alpha} b_{\alpha,m}. \quad (13)$$

Each element in the a and b matrices have a one-to-one mapping into scan order arrays, and the first element of the scan order array ($a'_0 = a_{0,0}$) is the following:

$$a'_o = \sum_{\beta=0}^{N-1}\sum_{\alpha=0}^{N-1} c_{0,\beta} d_{\alpha,0} b_{\beta,\alpha} = \sum_{\gamma=0}^{N^2-1} f_{0,\gamma} b'_\gamma. \quad (14)$$

Each element of f is determined on a term by term basis according to scan order. For example, using the scan order illustrated in FIG. 3A and N=8, $b_0=b_{0,0}$, $b'_1=b_{0,1}$, $b'_2=b_{1,0}$, ... $b'_{63}=b_{7,7}$, then $f_{0,0}=c_{0,0}d_{0,0}$, $f_{0,1}=C_{0,0}d_{1,0}$, $f_{0,2}=c_{0,1}d_{0,0}$, ... and $f_{0,63}=C_{0,7}d_{7,0}$.

In a similar fashion, the elements of the G matrix, which for the purposes of this disclosure is called a DCT-domain motion compensation (MC) matrix, are found. In one preferred embodiment, the memory 708 includes a complete set of G matrices to account for all possible integer pixel sub-block placements within the motion compensated block. As those skilled in the art are well aware, MPEG-2 allows for half pixel translations of a sub-block, which are accomplished through a linear combination of integer pixel translations. For the sake of clarity, motion vectors that translate a block of pixels from a reference frame into an inter-coded frame are considered to be integer translations, but those skilled in the art understand half-integer translations, and such translations are considered to be within the scope of the invention.

In an alternative preferred embodiment, the memory 708 includes a complete set of partial G matrices. In this embodiment, the partial G matrices are truncated versions of complete 64×64 G matrices. The partial G matrices include lower frequency components of the complete G matrices. Even though the use of partial G matrices results in the loss of motion compensation for some high frequencies, the quality of service for the user should not be substantially affected because the human eye is less responsive to changes in high frequency. Of course, the quality of service will depend upon the amount of truncation in the partial G matrices, and the size of the partial G matrices is determined by the operator of the STS 100.

Equation 11 provides the basis for performing DCT-domain motion compensation. However, the output of the VLD 704 includes sets of run-level (RL) pairs 216, which are of the form $[r_0, l_0, r_1, l_1, \ldots r_{n-1}, l_{n-1}, r_n, l_n]^T$, which is short form for a 64 element array consisting of zeroes and non-zero coefficients in scan order. Thus, in order to use equation 11, sets of run-level pairs need to be expanded into 64 element arrays. Instead of expanding sets of run-level pairs and then doing matrix multiplication, a computationally efficient way of calculating motion compensation for a given set of run-level pairs can be employed using information from the given set of run-level pairs. First, a $G_i$ ($H_i^{nr}$, $W_i^{nc}$) matrix is defined as $$G_i(H_i^{nr}, W_i^{nc}) = [g_i^0(H_i^{nr}, W_i^{nc}), g_i^1(H_i^{nr}, W_i^{nc}), \ldots g_i^{63}(H_i^{nr}, W_i^{nc})], \quad (15)$$

where $g_i^n(H_i^{nr}, W_i^{nc})$ is the nth column of $G_i(H_i^{nr}, W_i^{nc})$. For the given set of run-level pairs, a scan-position array is associated with the set of run-level pairs and the elements of the scan-position array are given by equation 6. A modified sub-matrix G', which is made up of selected columns of the $G_i(H_i^{nr}, W_i^{nc})$ matrix, is determined based upon the scan positions. The selected columns are determined from the following equation:

$$n=r_0, \quad (16a)$$

for the first selected column and $$n=i_{n-1}+r_n+1, \quad (16b)$$

for subsequent columns. For example, consider the exemplary set of run-level pairs illustrated in FIG. 4B and the corresponding run array 1002, level array 1004, and scan-position array 1006, which are illustrated in FIG. 10A. For this example, the modified sub-matrix G' is as follows:

$$G=[g_i^0, g_i^2, g_i^6, g_i^7, g_i^9, g_{i10}, g_i^{13}, g_i^{19}], \quad (17)$$

where the selected columns correspond to the values of the level array 1004, then $$D=G'L, \quad (18)$$

where L is the level array matrix 1004.

Motion Compensation

Figure 13:
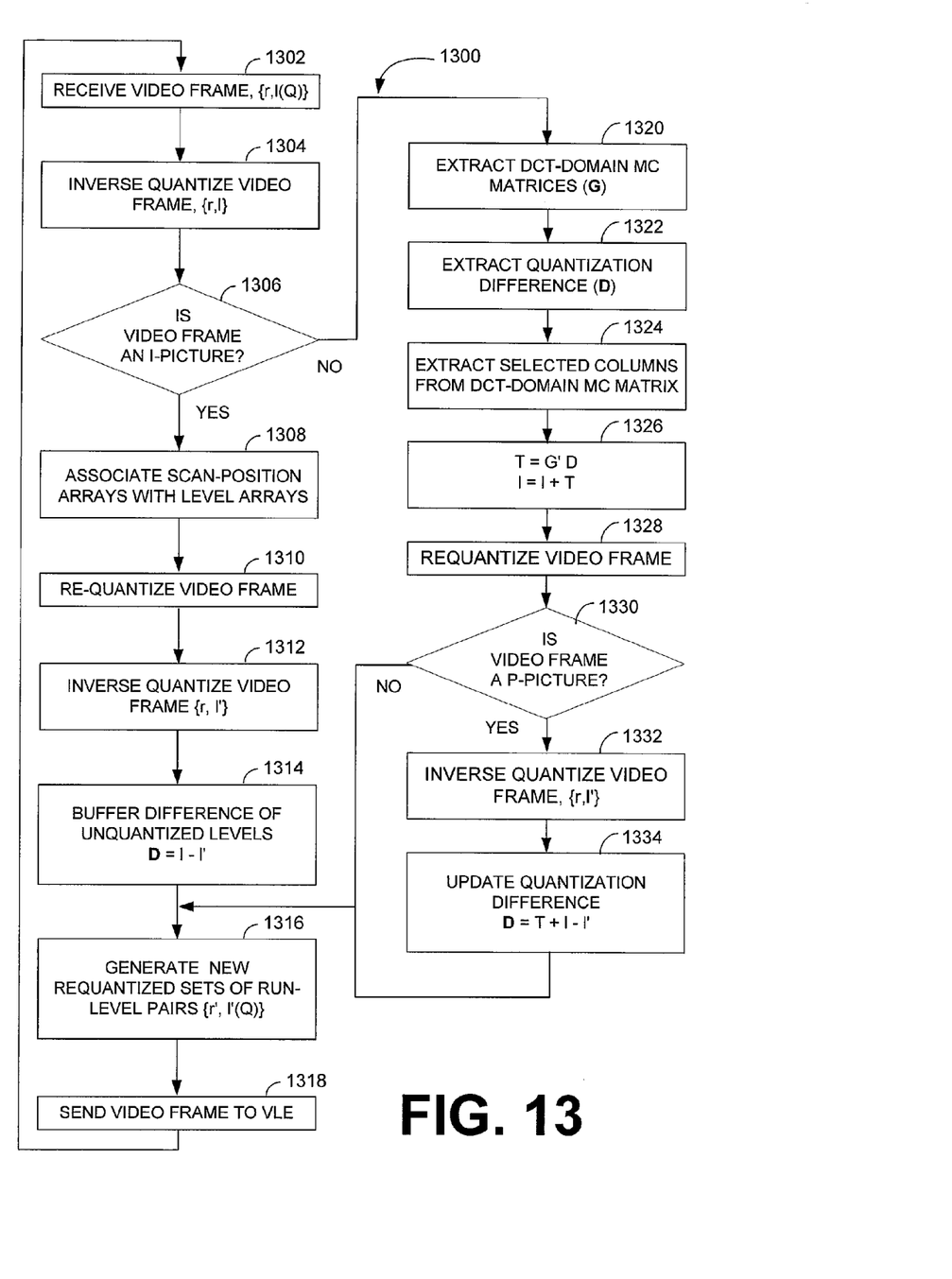
FIG. 13 is a flow chart of steps taken in motion compensation.

Refer to FIG. 13, steps 1300 illustrate exemplary logic that is implemented by the run-level domain transcoder 134 for applying motion compensation in the run-level domain to frames that are transcoded. In step 1302 the processor 706 receives a current frame from the VLD 704. The current frame includes, among other things, headers, and sets of quantized run-level pairs denoted by $\{r, l(Q_1)\}$. If the current frame is inter-coded, it also includes among other things motion vectors.

In step 1304, the inverse quantizer 1102 converts the sets of quantized run-level pairs $\{r,l(Q_1)\}$ of the current frame into unquantized sets of run-level pairs, which are denoted as $\{r,l\}$.

In step 1306, the drift controller 1104 determines whether or not the current frame is an I-picture. The drift controller 1104 determines the type of picture using header information. Reference frames such as I-Pictures and P-Pictures are transmitted before any frame that depends on them is transmitted. Thus, a GOP such as I(1), B(2), B(3), P(4), B(5), B(6), P(7), B(8), B(9), P(10), ... B(N−2), B(N−1), P(N) is transmitted in the following order: I(1), P(4), B(2), B(3), P(7), B(5), B(6), P(10), B(8), B(9), ... P(N), B(N−2), B(N−1). Consequently, a description of how the drift controller 1104 processes I-pictures is provided first, followed by a description of P-picture and B-picture processing.

Intra-Coded Frames (I-Picture)

In step 1308, the drift controller 1104 associates a scan-position array 1006 with each set of unquantized run-level pairs $\{r,l\}$. In one preferred embodiment, the values of the scan-positions are calculated using equation 6. Sometimes the scan pattern that is used in a GOP changes from one frame to another. Consequently, the processor 706 checks the scan pattern for the current frame using header information and maps the scan-positions from the scan pattern used by the current frame to a reference scan pattern. For example, if the scan pattern illustrated in FIG. 3A is the reference scan pattern and the scan pattern illustrated in FIG. 3B is the scan pattern of the current frame, then a scan-position of "2" would map to a scan-position of "3". The reference scan pattern is used for processing current frame and all of the subsequent frames.

In step 1310, the drift controller 1104 sends the input frame to the quantizer 1106, which requantizes using the quantization parameter $Q_2$. The requantized levels of a set of run-level pairs are denoted as $\{l'(Q_2)\}$. As a consequence of requantization, some of the levels in the requantized set are set to zero, as illustrated in FIG. 10B for the temporary level array 1010. The associated scan-position array 1006 and the associated run values are not updated.

In step 1312, the inverse quantizer 1102 unquantizes the requantized sets of run-level pairs $\{r',l'(Q_2)\}$, and the unquantized sets of run-level pairs are denoted by $\{r,l'\}$. The sets of run-level pairs denoted by $\{r,l'\}$ are hereinafter referred to as unquantized-requantized sets of run-level pairs.

In step 1314, the drift controller 1104 determines a set of quantization differences $D_i$ for the unquantized levels "l" and "l'" for each set of run-level pairs that make up the current frame. The quantization difference $D_i$ is the result of the requantization of the levels from the $Q_1$ parameter to the $Q_2$ parameter of the $i^{th}$ set of run-level pairs. The sets of quantization differences (D) are stored in memory 708 and used in the motion compensation of run-level domain residual pseudo-pictures for subsequent P-pictures and B-pictures. In one preferred embodiment, the scan-position arrays 1006 that are associated with the sets of run-level pairs are associated with the corresponding sets of quantization differences and are buffered in memory 708.

In step 1316, the drift controller 1104 updates the runs of the requantized sets of run-level pairs $\{r,l'(Q_2)\}$ to produce new sets of requantized run-level pairs, which are denoted by $\{r',l'(Q_2)\}$. In one preferred embodiment, the requantization of the levels is done in parallel, and the calculations of the new runs associated with the requantized levels is done in parallel. In one preferred embodiment, the drift controller 1104 employs equations 6 and 7 in the calculations of the new runs.

In step 1318, the processor 706 sends the requantized run-level pairs $\{r',l'(Q_2)\}$ of the current frame to the VLE 710 for processing. In one preferred embodiment, the requantized run-level pairs $\{r',l'(Q_2)\}$ includes updated run values (r') that are associated with levels having non-zero values and original run values (r) that are associated with levels that have the value of zero. In this case, the VLE 710 is adapted to ignore run-level pairs in which the level is zero (r,0).

Inter-Coded Frames (P-Pictures and B-Pictures)

Referring back to step 1306, responsive to the input frame being a P-picture or B-picture, the drift controller 1104 proceeds to step 1318 and buffers the current frame in the memory 708.

In step 1320, the drift controller 1104 extracts DCT domain MC matrices (G) from the memory 708. Each of the DCT domain MC matrices in the memory 708 is associated with a motion vector, and the drift controller 1104 uses the motion vectors for the current frame to determine which DCT domain MC matrices (G) to extract.

In step 1322, the drift controller 1104 extracts selected sets of quantization differences from the memory 708. The selected sets of quantization differences correspond to the reference frame blocks for motion compensated blocks of the current frame, and the drift controller 1104 uses the header information of the current frame to determine which quantization differences ($D_i$) to extract, where "i" denotes that the quantization difference corresponds to the "$i^{th}$" block of the reference frame. Each set of the quantization differences is associated with a particular DCT domain MC matrix (G) through the motion vectors. When the current frame is a P-Picture, the sets of quantization differences are from the preceding reference frame such as an I-Picture or P-Picture. When the current frame is a B-Picture, the sets of quantization differences are selected from the preceding reference frame such as an I-Picture or P-Picture, and from the subsequent P-Picture reference frame. In the preferred embodiment, the drift controller 1322 extracts associated scan-position arrays 1006 for each extracted set of quantization differences.

In step 1324, for each extracted set of quantization differences $D_i$ the drift controller 1104 uses the associated scan-position array to extract selected columns from its associated DCT domain MC matrix (G) to produce modified sub-matrices (G'). The columns of the modified sub-matrices G' are determined from the scan-position arrays. The drift controller 1104 also associates scan-position arrays with sets of run-level pairs $\{r,l\}$ of the current frame. The elements of the scan-position array are the scan position of the non-zero DCT coefficients for each set of run-level pairs. If the scan pattern for the current frame is not the reference scan pattern, then the scan-positions are mapped into scan-positions of the current frame.

In step 1326, for each set of run-level pairs $\{r,l\}$ of the current frame the drift controller 1104 calculates motion compensation for the quantization differences by matrix multiplication of the modified sub-matrix G' with the associated set of quantization differences D, and the product (T) is buffered in memory 708. Typically, as illustrated in FIG. 12, a block in the current frame receives information from four blocks in a reference frame, and consequently, $$T = \sum_{i=1}^{4} G'_i D_i.$$

Conceptually, the modified sub-matrix G' maps quantization differences associated with a block in reference frame into a motion compensated block of the current frame. In addition, the drift controller 1104 updates level values for each set of run-level pairs $\{r,l\}$ by adding the motion compensation for the quantization differences to the levels.

In one preferred embodiment, an opportunistic scheme is employed such that a given set of run-level pairs $\{r,l\}$ is equal to the given set of run-level pairs $\{r,l\}$ plus the motion compensated quantization difference, where only like scan positions of the motion compensated quantization difference are added to the given set of current run-level pairs $\{r,l\}$. In this embodiment, the runs of the given set of run-level pairs do not change as a consequence of adding the motion compensated quantization difference.

In step 1328, the quantizer 1106 requantizes the levels of the current frame using the quantization parameter $Q_2$. The requantized sets of run-level pairs are denoted by $\{r,l'(Q_2)\}$. In step 1330, the drift controller determines whether the current frame is a P-Picture or a B-Picture. If the current frame is a B-Picture, the drift controller 1104 proceeds to step 1316. However, if the current frame is a P-Picture, the drift controller proceeds to step 1332, and the inverse quantizer 1102 inverse quantizes the requantized sets of run-level pairs $\{r,l'(Q_2)\}$ to produce unquantized-requantized sets of run-level pairs $\{r,l'\}$ for the current frame.

In one embodiment, the current frame is requantized using a plurality of quantization parameters. The quantizer 1106 requantizes sets of run-level pairs on a set by set basis using different quantization parameters. In addition, selected sets of run-level pairs of the current frame can be requantized by the quantizer 1106 using one or more quantization parameters, and other sets of run-level pairs of the current frame are not requantized. Headers of the current frame such as slice headers and macroblock headers are updated to include the quantization parameter used in the associated sets of run-level pairs.

In step 1334, the sets quantization differences are updated. For a given set of quantization differences $D_k$, where the given set of quantization differences corresponds to the $k^{th}$ block in the reference frame, the updated given set of quantization differences is equal to the sum of the motion compensated quantization differences (T) for that given set plus the of the quantization difference $(l-l')_k$ of the unquantized levels for the sets of run-level pairs corresponding to the $k_{th}$ block of the current frame. The updated sets of quantization differences for the current frame are buffered in the memory 708. In one preferred embodiment, the memory 708 includes buffers for at least two frames worth of quantization differences so that it can include quantization differences for both the immediately preceding reference frame (an I-Picture or P-Picture) and the current reference frame (a P-Picture) in order to properly process B-Pictures.

In one preferred embodiment, the quantization differences for different types of frames such as video-frames, top video-fields, and bottom video-fields are accumulated in memory 708 separately. In this embodiment, the processor 706 determines whether the current frame is a video-frame, i.e., non-interlaced, or a top video-field, or a bottom video-field using the header information of the current frame and then extracts the appropriate sets of quantization differences from the memory 708 for motion compensation and updates the appropriate sets of quantization differences.

It should be emphasized, that for the sake of clarity, the steps 1300 were described in a sequential manner. However, as those skilled in the art will recognize, the steps could be implemented in a different order and/or in parallel. In one preferred embodiment, steps such as, but not limited to, quantizing, inverse quantizing, calculation of new run values, and linear operations of matrices are done in parallel to enhance computational efficiency. Furthermore, it should be noted that the motion compensation is performed in the run-level domain because the sets of run-level pairs are not expanded into DCT-domain matrices. Thus, computational efficiency is had by not inverse scanning sets of run-level pairs into DCT-domain matrices and, then after processing, scanning the DCT-domain matrices back into sets of run-level pairs.

In one preferred embodiment, the motion compensation is implemented using expanded level arrays, which are 64×1 in size. In this embodiment, the sets of quantized run-level pairs $\{r,l(Q_1)\}$, the sets of unquantized run-level pairs $\{r,l\}$, the sets of requantized run-level pairs $\{r,l'(Q_2)\}$, and the sets of unquantized-requantized run-level pairs $\{r',l'\}$ are expanded such that the levels are now in scan order. Because the various sets of run-level pairs are expanded, the matrix operations in steps 1314, 1326, and 1334 are done for each level according to scan order.

In one preferred embodiment, B-Pictures are processed doing requantization without motion compensation. In other words, for B-Picture steps 1320-1326 are skipped over. Motion compensation of B-Pictures can be skipped because B-Pictures are not used as reference pictures and any drift error in the B-Pictures is not accumulated and used in the motion compensation of subsequent pictures. Since many MPEG-2 streams contain a majority of B-Pictures, computational efficiency is enhanced by not doing motion compensation for B-Pictures.

Although exemplary preferred embodiments of the present invention have been shown and described, it will be apparent to those of ordinary skill in the art that a number of changes, modifications, or alterations to the invention as described may be made, none of which depart from the spirit of the present invention. Changes, modifications, and alterations should therefore be seen as within the scope of the present invention. It should also be emphasized that the above-described embodiments of the present invention, particularly, any "preferred embodiments" are merely possible non-limiting examples of implementations, merely setting forth a clear understanding of the principles of the inventions.

What is claimed is:

1. A transcoder comprising:
   a memory having multiple sets of runs buffered therein, and multiple sets of levels buffered therein, wherein the multiple sets of runs and multiple sets of levels define multiple sets of run-level pairs of a given frame of a stream of frames;
   a processor in communication with the memory, the processor adapted to process in the run-level domain the multiple sets of run-level pairs of the given frame using at least the sets of runs, and, for a given set run-level pairs of the multiple sets of run-level pairs, to selectively zero levels of the given set of run-level pairs using the frequencies of the levels of the given set of run-level pairs; and
   a vector length encoder in communication with the processor, the vector length encoder adapted to receive the processed multiple sets of run-level pairs of an inter-coded frame and encode the multiple sets of run-level pairs into bits for a second bit stream, wherein the bit size of the given frame in the second bit stream is smaller than the bit size of the given frame in the first bit stream, wherein the bit size of the given frame corresponds to a total number of bits in the given frame.

2. The transcoder of claim 1, further including: a vector length decoder in communication with the memory, the vector length decoder receives the first bit stream and decodes the bits of the first bit stream into the multiple sets of runs and multiple sets of levels and provides sets of multiple sets of runs and multiple sets of level to the memory for buffering therein.

3. The transcoder of claim 2, wherein the processor requantizes levels in the multiple sets of run-level pairs.

4. The transcoder of claim 3, wherein prior to requantization, a given set of levels of the multiple sets of levels is defined by a contiguous sequence of non-zero values and only one zero values, and after requantization, the given set of levels includes more than one zero values.

5. The transcoder of claim 3, wherein prior to requantization, a given set of levels of the multiple sets of consists of a contiguous sequence of non-zero values, and after requantization, the given set of levels includes at least one zero value.

6. The transcoder of claim 3, wherein the memory includes multiple scan-position arrays that are associated with the multiple sets of run-level pairs, wherein for a given scan-position array the elements thereof index the scan positions of the levels of particular set of levels, wherein the particular set of levels partially defines a given set of run-level pairs that is associated with the given scan-position array.

7. A transcoder comprising:
   a memory having multiple sets of runs buffered therein, and multiple sets of levels buffered therein, wherein the multiple sets of runs and multiple sets of levels define multiple sets of run-level pairs of a given frame of a stream of frames;
   a processor in communication with the memory, the processor adapted to process in the run-level domain the multiple sets of run-level pairs of the given frame using at least the sets of runs, and, for a given set run-level pairs of the multiple sets of run-level pairs, to selectively zero levels of the given set of run-level pairs using a thresholding function that selectively zeros levels based upon both amplitude and frequency; and
   a vector length encoder in communication with the processor, the vector length encoder adapted to receive the processed multiple sets of run-level pairs of an inter-coded frame and encode the multiple sets of run-level pairs into bits for a second bit stream, wherein the bit size of the given frame in the second bit stream is smaller than the bit size of the given frame in the first bit stream, wherein the bit size of the given frame corresponds to a total number of bits in the given frame.

8. The transcoder of claim 7, further including: a vector length decoder in communication with the memory, the vector length decoder receives the first bit stream and decodes the bits of the first bit stream into the multiple sets of runs and multiple sets of levels and provides sets of multiple sets of runs and multiple sets of level to the memory for buffering therein.

9. The transcoder of claim 8, wherein the processor requantizes levels in the multiple sets of run-level pairs.

10. The transcoder of claim 9, wherein prior to requantization, a given set of levels of the multiple sets of levels is defined by a contiguous sequence of non-zero values and only one zero values, and after requantization, the given set of levels includes more than one zero values.

11. The transcoder of claim 9, wherein, prior to requantization, a given set of levels of the multiple sets of consists of a contiguous sequence of non-zero values, and after requantization, the given set of levels includes at least one zero value.

12. The transcoder of claim 9, wherein the memory includes multiple scan-position arrays that are associated with the multiple sets of run-level pairs, wherein for a given scan-position array the elements thereof index the scan positions of the levels of particular set of levels, wherein the particular set of levels partially defines a given set of run-level pairs that is associated with the given scan-position array.

13. A transcoder comprising:
a memory having multiple sets of runs buffered therein, multiple sets of levels buffered therein, multiple sets of quantization differences buffered therein, wherein the multiple sets of runs and multiple sets of levels define multiple sets of run-level pairs of an inter-coded frame, and wherein each set of run-level pairs represents information for a block of pixels, the memory further including a group of scan-position arrays, wherein the multiple sets of levels are associated with the group of scan-position arrays, and wherein a given scan-position array, which is associated with a given set of levels, indexes the scan positions for the levels of the given set of levels; and
a processor in communication with the memory, the processor adapted to apply motion compensation to the sets of run-level pairs of the inter-coded frame using at least the sets of quantization differences, wherein for a given set of run-level pairs the processor applies motion compensation by adding to a specific set of unquantized levels (1) a specific set of quantization differences (D).

14. The transcoder of claim 13, wherein the processor is further adapted to inverse quantize the multiple sets of levels to produce multiple sets of unquantized levels (1) using a quantization parameter ($Q.sub.1$).

15. The transcoder of claim 13, wherein the specific set of quantization differences (D) is selected using at least one motion vector of the inter-coded frame.

16. The transcoder of claim 13, wherein the addition of the specific set of quantization differences (D) to the specific set of unquantized levels (1) involves matrix multiplying the specific set of unquantized levels (1) by a specific DCT-domain motion compensation matrix and adding the result to the specific set of unquantized levels (1).

17. The transcoder of claim 16, wherein the specific DCT-domain motion compensation matrix is one of a plurality of DCT-domain motion compensation matrices that is selected using at least a portion of a motion vector.

18. The transcoder of claim 13, wherein the processor is adapted to determine whether the inter-coded frame is a reference frame for a subsequent inter-coded frame in the stream of frames and wherein the given set of run-level pairs corresponds to a specific block of pixels in a frame, wherein the particular set of quantization differences is associated with the specific block of pixels, wherein the processor accumulates quantization differences for the particular set of quantization differences by motion compensating the specific set of quantization differences and adding the instantaneous set of quantization differences thereto.

19. The transcoder of claim 13, wherein the processor applies motion compensation to the sets of run-level pairs of the inter-coded frame using at least the sets of quantization differences, the first group of scan-position arrays, and the second group of scan-position array.

* * * * *